United States Patent [19]

Mayo

[11] Patent Number: 4,458,869

[45] Date of Patent: Jul. 10, 1984

[54] HOLDER FOR MICRO-RECEIVER OR TRANSMITTER-RECEIVER

[76] Inventor: Philip M. Mayo, 431 Paul St., Reading, Pa. 19607

[21] Appl. No.: 290,522

[22] Filed: Aug. 6, 1981

[51] Int. Cl.³ .............................................. E04G 3/00
[52] U.S. Cl. ................................ 248/225.1; 248/222.1
[58] Field of Search ............... 248/225.1, 220.2, 222.1, 248/225.2, 56, 73, 360, 311.1, 213, 340

[56] References Cited

U.S. PATENT DOCUMENTS

| | | | |
|---|---|---|---|
| 1,580,788 | 4/1926 | Lingard | 248/360 |
| 2,931,672 | 4/1960 | Merritt et al. | 248/56 |
| 3,542,324 | 11/1970 | Willinger | 248/360 |
| 3,575,371 | 4/1971 | Carlstedt | 248/340 |
| 3,927,597 | 12/1975 | Stults et al. | 248/220.2 |
| 4,133,509 | 1/1979 | Kalbow et al. | 248/225.1 |

FOREIGN PATENT DOCUMENTS 654259  12/1962  Canada ............................ 248/231.1

Primary Examiner—William H. Schultz
Assistant Examiner—Ramon O. Ramirez
Attorney, Agent, or Firm—William J. Ruano

[57] ABSTRACT

A holder for a micro-receiver or transmitter-receiver, which holder is on a handle of a portable radio. The holder comprises a spherical segment integrally attached to a shank encircled by a spring to permit a clip on the micro-receiver to be received yieldingly between the spherical segment and holder, whereby the micro-receiver will not become displaced by jarring or vibration.

1 Claim, 4 Drawing Figures

HOLDER FOR MICRO-RECEIVER OR TRANSMITTER-RECEIVER

This invention relates to a holder for a micro-receiver or transmitter-receiver supported on a handle of a portable radio.

An outstanding disadvantage of conventional holders which are in the form of a solid piece rigidly secured to the handle and having a projection for receiving the clip of the micro-receiver is that as the result of vibrations, such as when riding a train, the clip will cause excessive wear on the handle and eventually the micro-receiver will fall off and cause damage to the micro-receiver (or transmitter receiver).

An object of the present invention is to overcome the above-named disadvantages by providing a novel holder construction which will avoid excessive wear and eventual loosening and falling off of the micro-receiver or transmitter-receiver supported on the holder.

A more specific object of the invention is to provide a holder including a spring-biased supporting element on the handle of a portable radio which will firmly hold the receiver under the tension of the spring to assure against wear and accidental detachment of the micro-receiver from the holder.

Other objects and advantages of the invention will become more apparent from a study of the following description taken with the accompanying drawing wherein.

Figure 1:
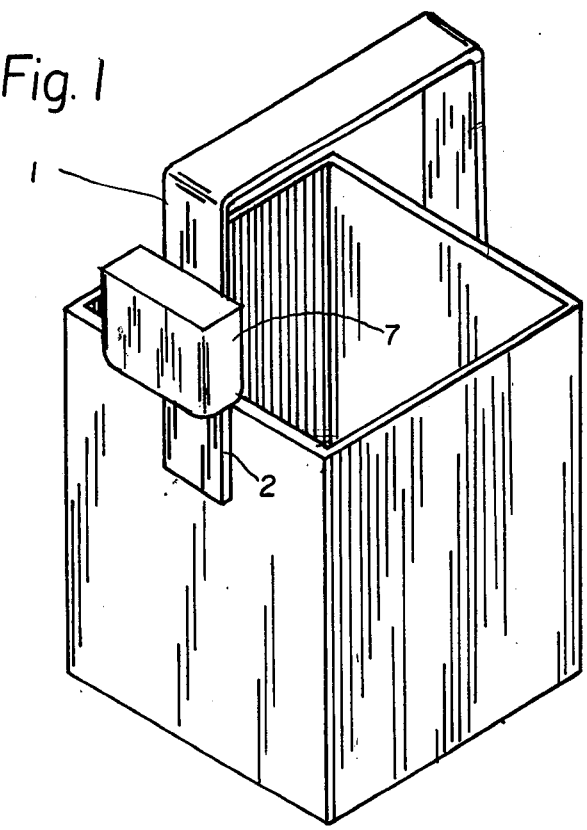
FIG. 1 is an upper perspective view of a handle portion of a portable radio having supported thereon a holder embodying the principles of the present invention.
Figure 2:
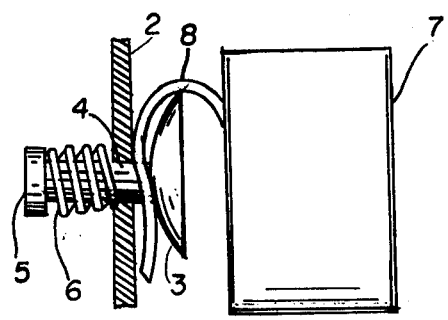
FIG. 2 is a side view of the holder shown in FIG. 1; shown somewhat enlarged and partly in cross-section.

Referring more particularly to FIGS. 1 and 2 of the drawing, numeral 1 generally denotes a handle for attachment to the housing of a portable radio (not shown). Numeral 2 denotes a vertical portion of the handle which supports a holder or support 3 constructed in accordance with the principles of the present invention. Support 3 is preferably a spherical segment shaped bolt head having an integral shank 4 terminating in a nut 5 which serves as a stop or retainer for a helical spring 6 exerting tension between the nut 5 and inner surface of handle portion 2. As will be seen hereinafter, the clip of the receiver is inserted between the bolt head 3 and vertical portion 2 of the handle and held firmly therebetween by the tension of the spring 6.

Figure 3:
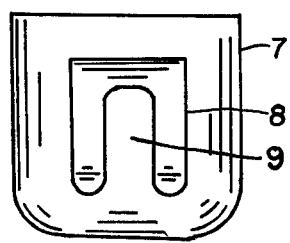
FIG. 3 is a rear view of either a microphone-receiver or a transmitter-receiver.
Figure 4:
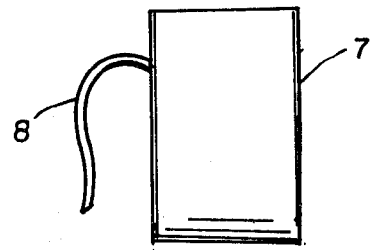
FIG. 4 is a side view of the receiver shown in FIG. 3.

Referring more particularly to FIGS. 3 and 4, numeral 7 denotes a micro-receiver or a transmitter-receiver of the radio having an integral clip 8, which clip is provided with a central vertical slot 9 for guiding the clip on opposite sides of shank 4 as the clip is pushed downwardly between the bolt head 3 and vertical handle portion 2.

It will be apparent that when the clip 8 is mounted, the tension of the spring 6 will prevent relative movement between the clip 8 and bolt head 3 or portion 2. Therefore, even as the result of violent movement or vibration caused by a train or other conveyance which carries the portable radio, there would be no accidental dislodgement of the receiver from the holder which could cause damage to the receiver, such as by falling onto a floor.

Thus it will be seen that I have provided a highly efficient and reliable holder for a micro-receiver or transmitter-receiver, which eliminates the necessity of an extra piece mounted on the handle for supporting the receiver and which holder is relatively inexpensive and of simple construction, using standard parts, and which will yieldingly hold the clip of the micro-receiver or transmitter-receiver in a firm manner in spite of excessive vibration.

While I have illustrated and described a single embodiment of my invention, it will be understood that this is by way of illustration only and that various changes and modifications may be contemplated in my invention and within the scope of the following claims.

I claim:

1. A housing for a portable radio including a handle of substantially inverted U-shape extending from the top thereof, a support comprising a spherical segment shaped bolt head having an integral shank extending through a vertical portion of said handle, said shank terminating in a nut, a helical spring surrounding said integral shank and having one end contacting an outer surface of said vertical portion of said handle and the other end contacting said nut which serves as a stop or retainer therefor, a receiver having an integral clip extending outwardly and downwardly from one side of said receiver, said clip having a central vertical slot for guiding it on opposite sides of said shank as the clip is pushed downwardly between said bolt head and said vertical handle portion, whereby the tension of said spring will prevent relative movement between said clip and bolt head and whereby accidental dislodgement of said receiver from said shank is minimized despite violent movement or vibrations of said housing.

* * * * *